UNITED STATES PATENT OFFICE.

HARRY WILLIAMS CHARLTON, OF NEW YORK, N. Y., ASSIGNOR TO AMERICAN POTASH CORPORATION, A CORPORATION OF VIRGINIA.

PROCESS OF PRODUCING COMBINED POTASSIUM FROM GREENSAND.

1,329,369.     Specification of Letters Patent.     Patented Feb. 3, 1920.

No Drawing.     Application filed November 12, 1918. Serial No. 262,123.

*To all whom it may concern:*

Be it known that I, HARRY WILLIAMS CHARLTON, a citizen of Canada, residing at New York city, in the county of New York and State of New York, have invented certain new and useful Improvements in Processes of Producing Combined Potassium from Greensand; and I do hereby declare the following to be a full, clear, and exact description of the invention, such as will enable others skilled in the art to which it appertains to make and use the same.

This invention relates to a process of extracting combined potassium from green sand containing the same and has for its object to improve the processes that have been heretofore proposed.

With this and other objects in view the invention consists in the novel steps and combinations of steps constituting the process all as will be more fully hereinafter described and particularly pointed out in the claims.

In order that the precise invention may be the more clearly understood it is said:—

It is well known that it has been proposed prior to my invention to decompose potassium bearing silicates such as feldspars, for example, by subjecting them to a digestion process with lime, up to say 150 pounds pressure, but such processes are complete failures commercially, owing to the very small or inconsequential yields of potassium. Again, feldspars of this kind always contain more or less sodium, which is quite difficult to economically separate from the potassium present, and therefore, this added expense tends to destroy the efficiency of the procedure.

In addition to this, feldspars contain alumina which render the process inoperative commercially, owing to the commercial impossibility of getting an efficient separation of the alkali metals therefrom. After a great deal of practical experimentation, I have discovered that the pressures of say 150 pounds heretofore proposed in these lime feldspar processes were entirely too low, and because the calcium hydrate present remains substantially unchanged or chemically inert, at such pressures. Accordingly, I raised the pressures to above 150 pounds and preferably to 200 pounds and higher, when I was surprised to find that the calcium hydrate seemingly became partially dehydrated, and that the sub-hydrate thus formed became apparently chemically very active. Whatever may be the real facts, I observed the remarkable phenomena that, calcium hydrate which remained substantially unchanged at the pressure of the prior processes lost water when digested with agitation at 200 pounds pressure and higher, even in the presence of ten times its weight of water.

These practical tests further lead me to discover that a very large excess of water is essential to commercial success in a lime-feldspar digestion. Upon a further investigation I found the reason for this said excess of water resided in the fact that owing to the combined aluminum present, an efficient separation of the combined alkali metals in the rock could not be effected in the absence of said excess of water. A still further investigation showed that the proportions of water, as well as the pressures, specified in the prior lime-feldspar processes, were entirely too small to render them operative commercially; and that at least a quantity of water by weight equal to five times the weight of lime present must be employed as well as a pressure above 160, 180 or 190 pounds to the square inch.

In fact, it was found the weight of water preferably should be about eight to ten times the weight of lime used, that the weight of feldspar should be about the same as the weight of lime, and that the pressures employed should preferably be above 200 pounds to the square inch. But even in a successful lime feldspar process as that just disclosed, it was still found that the cost of separating the sodium from the potassium was quite high, and that the evaporation of such a large excess of water was also very expensive, so that the commercial efficiency of the process was greatly lowered. Agitation of the mixture was found to be very important under all conditions.

All efforts to get the alkali metals separated from the alumina present in the feldspar in a more expeditious manner proving futile, I next began the investigation of other potassium bearing ores which contained no aluminum, and finally selected green sand because in it iron seemed to be combined with the potassium instead of aluminum, and I reasoned that iron compounds would not be so difficult to handle in carrying out the process as would aluminum compounds. Further, I observed that green sand contained no sodium and that its silicon did not seem to be combined with its potassium. It therefore seemed that if the above discoveries could be successfully applied to green sand, the objections to aluminum and to sodium would disappear and probably an easier extraction of potassium would result.

Upon testing out this line of reasoning I not only discovered that these said objections disappeared, when green sand was employed instead of feldspar, but also, that only about one half as much water was necessary to separate out substantially all the potassium in green sand as was required in the lime feldspar digestion, and that I could therefore cut down the evaporating costs very materially.

These advantageous features possessed by a lime green sand digestion over a lime feldspar digestion process as a source of combined potassium, coupled with the advantages which flow from the chemical change that takes place in the lime hydrate when pressures of about 200 pounds are reached, make a lime-green sand digestion process a very attractive one, and especially when the below mentioned valuable cementitious by-product is considered.

Accordingly, in carrying out my invention, I may take for example 500 pounds by weight of green sand, preferably in a finely divided condition; add thereto say 400 parts by weight of lime; and digest this mixture with say 1600 to 2000 parts by weight of water in an autoclave at a steam pressure of say 200 pounds to the square inch or higher for a period of about 2 hours and with mechanical agitation.

The resulting liquor may be filtered and the solids washed, when it will be found that from 80% to 90% of all the combined potassium present in the green sand free from aluminum has been recovered in the form of a hydrate which may be concentrated by evaporation. The solid residue left on the filter will be found to constitute a valuable cementitious by-product for use as a binder in the manufacture of brick and to materially lessen the cost of the potassium extracted.

It will therefore now be clear that the lime-green sand process involves the following differences and advantages over the lime-feldspar process even when the latter is commercially successful:

(a) Whereas a successful lime feldspar digestion requires at least an amount of water equal to about five times the weight of the lime present, and preferably eight times as much water, a successful lime green sand process may be carried out with a weight of water not exceeding say four times the weight of the green sand employed. This very great difference in the two processes effects a saving both in the initial heating and in the evaporation.

(b) While the alkali metal hydrates from the successful feldspar lime digestion usually contain from say 30% to 50% sodium hydrate, the alkali metal hydrates from the successful green sand digestion usually contain no sodium hydrate at all. This at once does away with the cost of separating the sodium from the potassium which is quite considerable.

(c) The alkali metal hydrates from the successful lime feldspar digestions are always contaminated with alumina which is a most objectionable impurity while in the successful green sand digestions this impurity is entirely absent, thus producing a potassium hydrate of higher quality than it is possible to produce from feldspar without purification.

(d) The total impurities found in the hydrate from a successful green sand digestion are so small or are so easily removed that a commercially pure product may be readily obtained, and sold without further treatment, which is very far indeed from being the case in a successful feldspar digestion process. No calcium hydrate appears in the green sand potassium hydrate product while under the prior feldspar digestions at 150 pounds, a material percentage of it appears.

(e) The reactions which take place at or above 200 pounds pressure are profoundly different in the green sand process from those which take place at 150 pounds pressure in the prior feldspar digestion processes. Not only do the reactions in the green sand process even at 150 pounds pressure produce an enormously greater yield of potassium hydrate over the prior feldspar processes, but they also produce at, or above 200 pounds pressure, a cementitious by-product which is totally absent in prior lime feldspar processes.

(f) The time of digestion in the green sand processes can be reduced from say one hour to four hours while in the feldspar process, the time required is often as much as 12 hours or longer.

(g) The mineralogical character of green sand is wholly different from that of feldspar. The feldspars are classed as igneous rocks, while I have found that green sand is not of igneous origin at all, but is probably of marine origin. Therefore, I suspected that chemicals would act differently upon these two sources of potash. Actual tests show such to be the fact, in that when equal and like parts of feldspar and green sand are treated with sulfuric acid, the reactions and resulting products are entirely different.

By employing mechanical agitation and a pressure of say 200 to 225 pounds to the square inch, together with a mixture consisting of say 500 parts of green sand 400 parts of lime and 2000 parts of water, I have repeatedly demonstrated on a commercial scale that over 90% of the potassium present may be extracted free from alumina in a period of say two to three hours, which is a very much shorter time than is possible with feldspar under the same conditions.

It will be observed that the process is not limited to the exact proportions above disclosed, for excellent results may be attained by employing a weight of lime equal to more than 70 per cent., to more than 75 per cent. or equal to from 50% to 80% of the sand. Commercial results are also attainable by employing sufficient lime and water and a sufficient pressure to extract as much as 60% of the potassium present. Especially is this true when more than 75 per cent. of the potassium present is obtained. In many cases, however, it is preferred that this pressure should exceed 190 pounds to the square inch, or even exceed 200 pounds to the square inch, and that the weight of the water used should be as much as three times and less than five times the weight of the sand. Especially is this the case when it is desired to form, in a short time, a cementitious binding material. When said binding material is not desired, and especially when a quick extraction is not aimed at, a pressure exceeding 170 pounds, or even, between 150 pounds and 190 pounds to the square inch may be employed.

It is therefore obvious that the above proportions of lime, sand and water, as well as the pressures mentioned may be varied without departing from the spirit of my invention, and therefore, I do not wish to be limited to the above disclosure except as may be required by the claims.

What I claim is:—

1. The process of extracting combined potassium from green sand which consists in mixing said sand with more than 50% of its weight of lime and with more than three times its weight of water; and digesting the same with agitation at a pressure exceeding 150 pounds to the square inch, substantially as described.

2. The process of extracting combined potassium substantially free from aluminum and sodium from green sand which consists in mixing said sand with more than 60% of its weight of lime and with more than three times and less than ten times its weight of water; and digesting the same for a period less than six hours at a pressure exceeding 150 pounds to the square inch, substantially as described.

3. The process of extracting combined potassium from green sand which consists in mixing said sand with more than 70% of its weight of lime and with more than three times and less than eight times its weight of water; and digesting the same for a period less than four hours at a pressure exceeding 160 pounds to the square inch, substantially as described.

4. The process of extracting combined potassium from green sand which consists in mixing said sand with more than 75% of its weight of lime and with more than three times and less than five times its weight of water; and digesting the same less than two hours at a pressure exceeding 175 pounds to the square inch, substantially as described.

5. The process of extracting combined potassium from green sand which consists in mixing said sand with more than 80% of its weight of lime and with more than three times and less than five times its weight of water; and digesting the same with agitation less than two hours at a pressure exceeding 190 pounds to the square inch, substantially as described.

6. The process of extracting combined potassium from green sand which consists in mixing said sand with about 80% of its weight of lime and with more than three times and less than four and one half times its weight of water; and digesting the same less than one and one half hours at a pressure exceeding 200 pounds to the square inch, substantially as described.

7. The process of extracting combined potassium from green sand which consists in mixing said sand with as much as 80% of its weight of lime and with more than three times and less than four times its weight of water; and digesting the same less than one and one quarter hours at a pressure exceeding 200 pounds to the square inch, substantially as described.

8. The process of making a crude potassium hydrate containing more than 95% KOH, less than 1% of sodium hydrate, less than 1% aluminum hydrate, and less than 3% of all other impurities, which consists in mixing green sand with lime and water, and subjecting the same to a digestion process at super-atmospheric pressure, substantially as described.

In testimony whereof I affix my signature.

HARRY WILLIAMS CHARLTON.